United States Patent
Nakachi et al.

(10) Patent No.: US 11,923,897 B2
(45) Date of Patent: Mar. 5, 2024

(54) METHOD, DEVICE AND PROGRAM FOR ESTIMATING OPTICAL COMMUNICATION STATUS

(71) Applicant: NIPPON TELEGRAPH AND TELEPHONE CORPORATION, Tokyo (JP)

(72) Inventors: Takayuki Nakachi, Musashino (JP); Yitu Wang, Musashino (JP); Tetsuro Inui, Musashino (JP); Takafumi Tanaka, Musashino (JP); Takahiro Yamaguchi, Musashino (JP); Katsuhiro Shimano, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 40 days.

(21) Appl. No.: 17/783,493

(22) PCT Filed: Dec. 11, 2019

(86) PCT No.: PCT/JP2019/048509
§ 371 (c)(1),
(2) Date: Jun. 8, 2022

(87) PCT Pub. No.: WO2021/117163
PCT Pub. Date: Jun. 17, 2021

(65) Prior Publication Data
US 2023/0018846 A1    Jan. 19, 2023

(51) Int. Cl.
*H04B 10/079*    (2013.01)

(52) U.S. Cl.
CPC ................ *H04B 10/0795* (2013.01)

(58) Field of Classification Search
CPC .................. H04B 10/079; H04B 10/0795
See application file for complete search history.

(56) References Cited

U.S. PATENT DOCUMENTS

| | | | |
|---|---|---|---|
| 8,526,485 B2 * | 9/2013 | Thompson | H04B 10/25751 375/222 |
| 2009/0222226 A1 * | 9/2009 | Baraniuk | H03M 13/11 702/66 |

FOREIGN PATENT DOCUMENTS

CN    107276938    *    6/2017    ......... H04L 27/0012

OTHER PUBLICATIONS

R. Mitra and V. Bhatia, "Adaptive Sparse Dictionary-Based Kernel Minimum Symbol Error Rate Post-Distortion for Nonlinear LEDs in Visible Light Communications," in IEEE Photonics Journal, vol. 8, No. 4, pp. 1-13, Aug. 2016, Art No. 7905413, doi: 10.1109/JPHOT.2016.2585105. (Year: 2016).*

(Continued)

*Primary Examiner* — Nathan M Cors
(74) *Attorney, Agent, or Firm* — Harness, Dickey & Pierce, P.L.C.

(57) ABSTRACT

The present disclosure has an object of proposing a method and a device for estimating the state of a transmission path or an optical transmitter capable of mechanically estimating a factor causing an error with a small amount of constellation data and a low computing amount. The present disclosure provides a device for estimating a state of optical communication, the device including: a data preprocessing unit that reduces the number of data using random sampling with respect to constellation data in which an amplitude and a phase of optical communication data are represented by a polar coordinate diagram and performs distribution calculation and a dimension reduction; a learning unit that learns a dictionary matrix in sparse coding using learning constellation data processed by the data preprocessing unit; and a recognition unit that calculates a sparse coefficient using recognition constellation data processed by the data preprocessing unit and the dictionary matrix learned by the learn- (Continued)

ing unit and estimates a factor causing degradation of the optical communication using the calculated sparse coefficient.

3 Claims, 10 Drawing Sheets

(56) References Cited

OTHER PUBLICATIONS

G. Zhang, C. Fei, S. He and X. Hong, "Sparse Nonlinear Equalization with Match Pursuit for LED Based Visible Light Communication Systems," 2017 Asia Communications and Photonics Conference (ACP), Guangzhou, China, 2017, pp. 1-3. (Year: 2017).*
Danshi Wang et al., Intelligent constellation diagram analyzer using convolutional neural network-based deep learning, Optics Express, vol. 25, No. 15, 2017, pp. 17150-17166.
Takafumi Tanaka et al., Field Demonstration of Real-time Optical Network Diagnosis Using Deep Neural Network and Telemetry, 2019 Optical Fiber Communications Conference and Exhibition (OFC), Mar. 3, 2019.
Takafumi Tanaka et al., Intelligent monitoring of optical fiber bend using artificial neural networks trained with constellation data, IEEE Networking Letters, vol. 1, No. 2, 2019, pp. 60-62.
Takayuki Nakachi, Sparse Modeling and its Applications to Media Processing, Institute of Electronics, Information and Communication Engineers, NV Study Group, May 2019.
Zhuolin Jiang et al., Label Consistent K-SVD: Learning a Discriminative Dictionary for Recognition, IEEE Transactions on Pattern Analysis and Machine Intelligence, vol. 35, No. 11, 2013, pp. 2651-2664.
Takayuki Nakachi et al., Intelligent Monitoring of Optical Fiber Transmission Using Sparse Coding, IEICE Technical Report, vol. 119, No. 229, 2019, pp. 77-82.

* cited by examiner

METHOD, DEVICE AND PROGRAM FOR ESTIMATING OPTICAL COMMUNICATION STATUS

CROSS-REFERENCE TO RELATED APPLICATIONS

This application is a 371 U.S. National Phase of International Application No. PCT/JP2019/048509, filed on Dec. 11, 2019. The entire disclosure of the above application is incorporated herein by reference.

TECHNICAL FIELD

The present disclosure relates to a method and a device capable of mechanically estimating a factor causing an error as a method for analyzing optical communication using constellation data.

BACKGROUND ART

Constellation data enables data transmitted through digital coherent communication to be expressed on a complex plane, and its diagram is a discrete diagram in which an amplitude and a phase are represented by a polar coordinate diagram. The confirmation of a deviation degree from a theoretical value makes it possible to quantitatively and visually confirm quality. The analysis of constellation data makes it possible to timely specify a factor causing the degradation of performance and find countermeasures for solving these problems and improving transmission quality. However, in a conventional constellation analysis, an expert has estimated a factor causing an error and has specified a correction target and taken countermeasures therefor.

In order to cope with this problem, a method using a high-order statistics to recognize a modulation format or a method using a principal component analysis (PCA) has been proposed. However, these statistical approaches require the acquisition of a large amount of constellation data. Further, the design of a method based on the statistical approaches requires high-level expert knowledge.

Meanwhile, the application of a data-driven algorithm as represented by deep learning to such a classic statistical model has been advanced. NPL 1 has proposed a method for estimating a modulation format and an OSNR using a convolutional neural network (CNN). Similarly, methods for detecting the bending states of optical fibers using a CNN have been proposed (see, for example, NPL 2 and NPL 3). It has been reported that the estimation of the bending states of optical fibers with high accuracy is possible. The deep learning shows extremely high estimation performance but disadvantageously requires a large amount of constellation data for learning. Further, a computing amount required for a learning time increases.

Constellation data is data obtained from a function block inside a digital signal processing circuit (DSP). In addition, the acquisition of several thousands of data is required in order to obtain a constellation map in which one point has a data amount of one byte and which can be clearly visually observable. When a PCIe interface enabling high-speed communication is mounted, data can be acquired at a relatively high speed. However, when a low-speed I2C or a serial interface such as MDIO is used, it takes a few minutes or a more time depending on a desired data amount. As a result, a problem may occur when the DSP is incorporated into a transceiver module. The transceiver module uses only MDIO described above as an access interface to a device and cannot use a PCIe interface. Therefore, it takes a long time to acquire constellation data. Thus, constellation data acquired by the transceiver module has a poor real time property.

From the above circumstances, it is desirable that learning or estimation can be performed with a small amount of constellation data, but deep learning known for its extremely high estimation performance disadvantageously requires a large amount of constellation data for learning. Further, a computing amount required for a learning time increases.

CITATION LIST

Non Patent Literature

[NPL 1] D. Wang, M. Zhang, J. Li, Z. Li, J. Li, C. Song and X. Chen, "Intelligent constellation diagram analyzer using convolutional neural network-based deep learning", Opt. Express, vol. 25, no. 1, pp. 17150-17166, July 2017.

[NPL 2] T. Tanaka, S. Kuwabara, H. Nishizawa, T. Inui, S. Kobayashi and A. Hirano, "Field demonstration of real-time optical network diagnosis using deep neural network and telemetry", 2019 Optical Fiber Communications Conference and Exhibition (OFC), San Diego, CA, USA, 2019, pp. 1-3.

[NPL 3] T. Tanaka, W. Kawakami, S. Kuwabara, S. Kobayashi and A. Hirano, "Intelligent monitoring of optical fiber bend using artificial neural networks trained with constellation data", IEEE Networking Letters, vol. 1, no. 2, pp. 60-62, June 2019.

[NPL 4] Takayuki Nakachi, [Invitation Lecture] Sparse Modeling and its Applications to Media Processing, Extract Essence of Data, IEICE Technical Committee on Network Virtualization, May 2019.

[NPL 5] Z. Jiang, Z. Lin and L. S. Davis, "Label Consistent K-SVD: Learning a discriminative dictionary for recognition", IEEE Transactions on Pattern Analysis and Machine Intelligence, vol. 35, no. 11, pp. 2651-2664, November 2013.

SUMMARY OF THE INVENTION

Technical Problem

The present invention has been made in view of the problem and has an object of proposing a method and a device for estimating the state of a transmission path or an optical transmitter capable of mechanically estimating a factor causing an error with a small amount of constellation data and a low computing amount.

Means for Solving the Problem

A device for estimating a state of optical communication according to the present disclosure includes:
  a data preprocessing unit that reduces the number of data using random sampling with respect to constellation data in which an amplitude and a phase of optical communication data are represented by a polar coordinate diagram and performs distribution calculation and a dimension reduction;
  a learning unit that learns a dictionary matrix in sparse coding using learning constellation data processed by the data preprocessing unit; and
  a recognition unit that calculates a sparse coefficient using recognition constellation data processed by the data preprocessing unit and the dictionary matrix learned by the learning unit and estimates a factor causing degradation of the optical communication using the calculated sparse coefficient.

A method for estimating a state of optical communication according to the present disclosure includes:
- reducing the number of data using random sampling with respect to constellation data in which an amplitude and a phase of optical communication data are represented by a polar coordinate diagram and performing distribution calculation and a dimension reduction by a data preprocessing unit;
- learning a dictionary matrix in sparse coding using learning constellation data processed by the data preprocessing unit by a learning unit; and
- calculating a sparse coefficient using recognition constellation data processed by the data preprocessing unit and the dictionary matrix learned by the learning unit and estimating a factor causing degradation of the optical communication using the calculated sparse coefficient by a recognition unit.

A program for estimating a state of optical communication according to the present disclosure causes a computer to perform:
- a data preprocessing step of reducing the number of data using random sampling with respect to constellation data in which an amplitude and a phase of optical communication data are represented by a polar coordinate diagram and performing distribution calculation and a dimension reduction;
- a learning step of learning a dictionary matrix in sparse coding using learning constellation data processed in the data preprocessing step; and
- a recognition step of calculating a sparse coefficient using recognition constellation data processed in the data preprocessing step and the dictionary matrix generated in the learning step and estimating a factor causing degradation of the optical communication using the calculated sparse coefficient.

Effects of the Invention

According to the present disclosure, it is possible to specify a factor causing the degradation of quality in optical communication with a small computing amount and with a high speed and high accuracy from a smaller amount of constellation data compared with a conventional technology.

DESCRIPTION OF EMBODIMENTS

Hereinafter, embodiments of the present disclosure will be described in detail with reference to the drawings. Note that the present disclosure is not limited to the following embodiments. These embodiments are given only for exemplification, and the present disclosure can be carried out in modes in which various modifications and improvements are made on the basis of the knowledge of persons skilled in the art. Note that constituting elements having the same symbols in the present specification and the drawings show the same elements.

Sparse coding has attracted attention as an information processing model that extracts useful information hidden in a large amount of data (see, for example, NPL 4). By considering most elements of a huge amount of data to be sparse and paying attention to non-zero elements, the essence of data is extracted. As opposed to the deep learning of a non-linear model, the sparse coding is a linear model and exhibits high performance for applications in which data to be analyzed has a sparse property. In comparison with deep learning such as a CNN, the sparse coding has the aspects of 1) learning with a small amount of data is possible, 2) a low computing amount, and 3) an explicable AI and therefore has received attention. In the present disclosure, a method for estimating the state of a transmission path or an optical transmitter using Label Consistent K-SVD (LC K-SVD) (see, for example, NPL 5) that is a sparse dictionary learning method will be proposed.

Hereinafter, state estimation using constellation data will be described before the description of specific examples.

[State Estimation Using Constellation Data]

Figure 1:
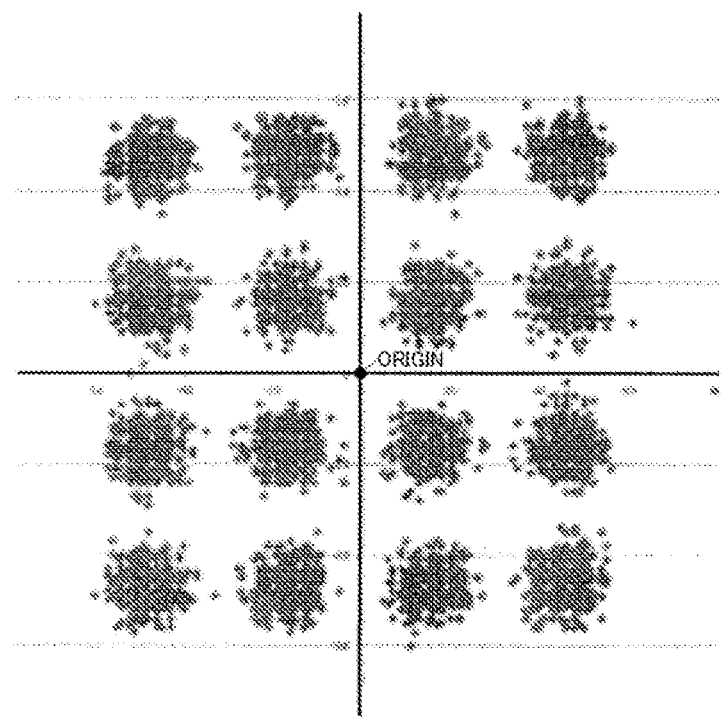
FIG. 1 shows an example of 16QAM (Quadrature Amplitude Modulation) constellation data.

Constellation data enables data transmitted through digital coherent communication to be expressed on a complex plane. The phase and amplitude information of a coherent communication signal can be visually expressed. FIG. 1 shows 16QAM (Quadrature Amplitude Modulation) constellation data. In the respective positions of 16 points, a rotation direction with respect to an axis shows phase information, and a distance from an origin shows amplitude information. For example, a 16QAM signal makes it possible to transmit information corresponding to 16 points=4 bits with one symbol. Note that the constellation data shows an integral state for a fixed time, and a signal state indicates any one of the 16 points in a certain time.

Figure 2:
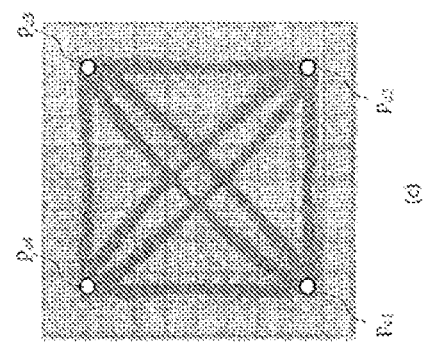
FIG. 2 shows an example of the error state of an optical transmitter estimated from constellation data, wherein (a) shows the phase error of a master bias in a modulator, (b) shows the imbalance state of an I/Q gain, and (c) shows the imbalance state of an I/Q skew.
Figure 2:
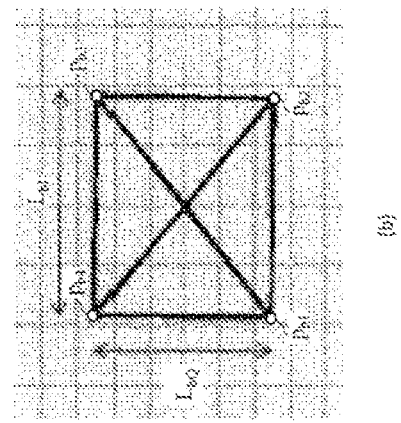
Figure 2:
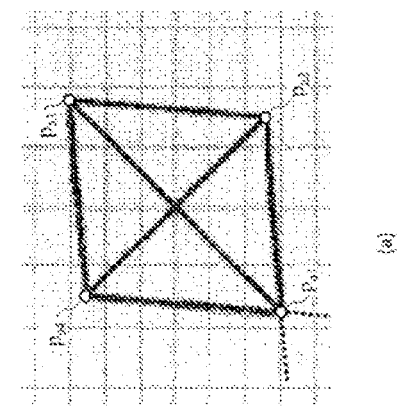

Since the constellation data expresses the phase state and the amplitude state of a signal, the state of a transmission path or an optical transmitter can be estimated according to its shape. Here, with respect to the state estimation of an optical transmitter, specific examples of state estimation for the three errors of the phase error of a master bias in a modulator, the imbalance state of an I/Q gain, and the imbalance state of an I/Q skew will be given. FIG. 2 shows respective constellation data. These states are primarily caused by the insufficient adjustment of an optical IQ modulation module shown in FIG. 3. Hereinafter, assumed specific factors will be described.

(a) Phase Error Of Master Bias in Modulator

As shown in FIG. 2 (a), constellation data $p_{a1}$, $p_{a2}$, $p_{a3}$, and $p_{a4}$ is distorted in a diamond shape since a phase is deviated.

Figure 3:
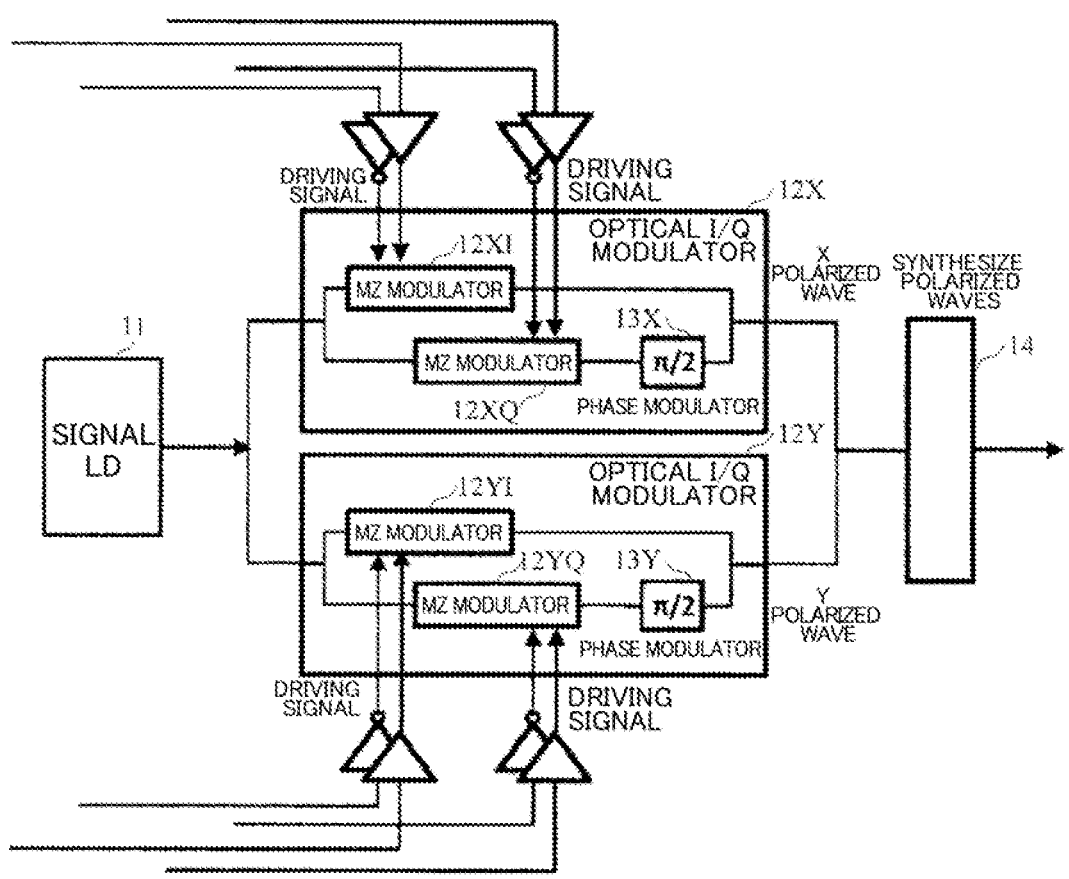
FIG. 3 shows an example of the configuration of an optical IQ modulation module.

In this case, there is a possibility that the biases of phase modulators 13X and 13Y are deviated in the optical IQ modulation module shown in FIG. 3.

(b) Imbalance State of I/Q Gain

As shown in FIG. 2(b), a length $L_{bI}$ in the I-axis direction of constellation data $p_{b1}$, $p_{b2}$, $p_{b3}$, $p_{b4}$ becomes longer than expected or a length $L_{bQ}$ in the Q-axis direction of the constellation data $p_{b1}$, $p_{b2}$, $p_{b3}$, $p_{b4}$ becomes shorter than expected.

In this case, there is a possibility that the amplitude of an I or Q driving signal in optical I/Q modulators 12X and 12Y is deviated in the optical IQ modulation module shown in FIG. 3.

(c) Imbalance State of I/Q Skew

As shown in FIG. 2 (c), points $p_{c1}$, $p_{c2}$, $p_{c3}$, and $p_{c4}$ of a constellation map are placed at expected positions but a track changing from the point $p_{c1}$ to the point $p_{c3}$ is different from an expected track.

In this case, there is a possibility that a correction value for a signal delay to a synthesizer 14 that synthesizes polarized waves together is deviated in the optical IQ modulation module shown in FIG. 3.

Examples: State Estimation Using Sparse Coding

As a method for enabling substantially highly-accurate estimation even with a small amount of data and a low computing amount, a state estimation method using sparse coding will be proposed. First, a general outline will be described. Then, preprocessing, sparse dictionary learning, and recognition that are element technologies will be described.

1. General Outline

Figure 4:
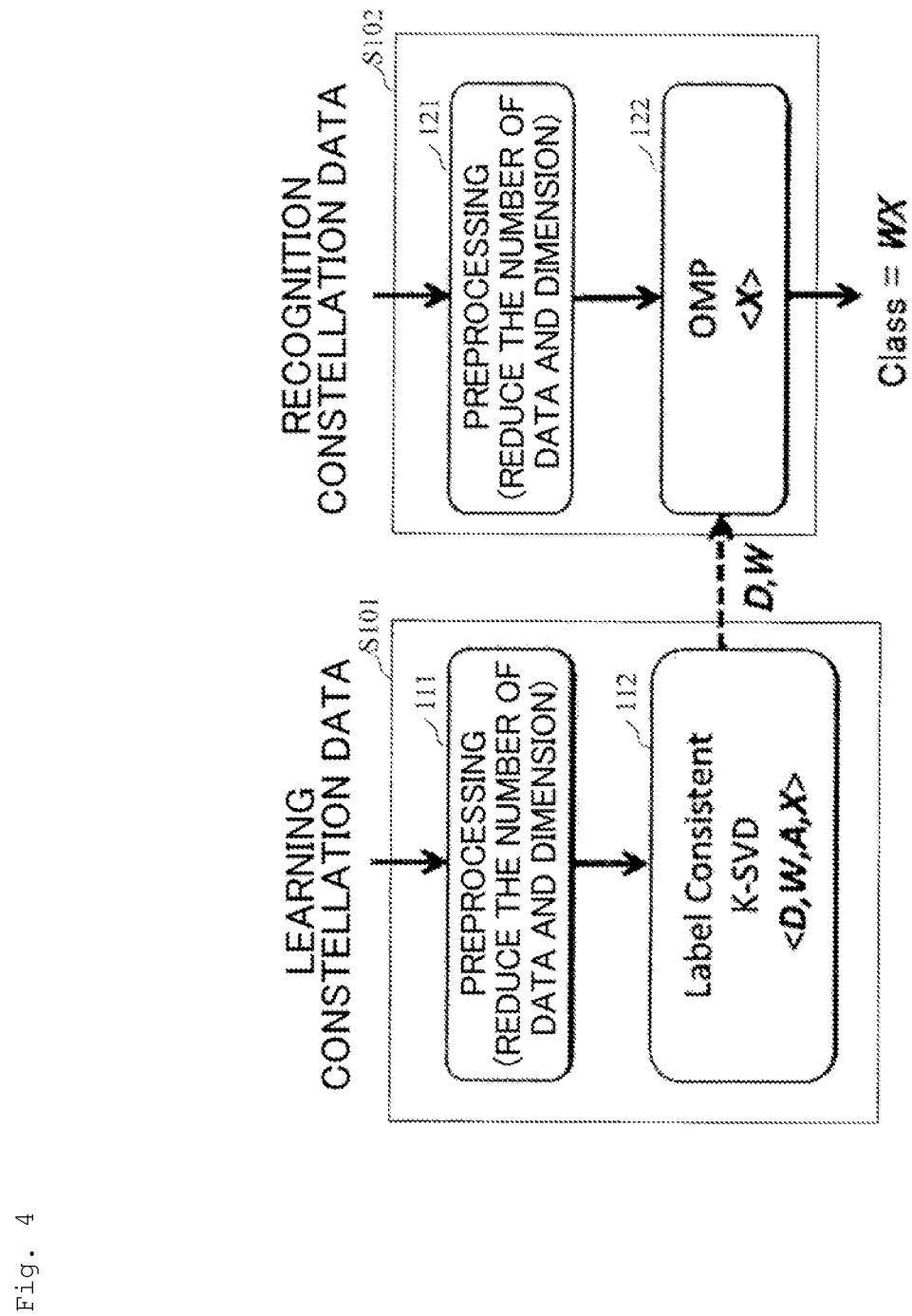
FIG. 4 shows the outline of state estimation using sparse coding.

FIG. 4 shows the outline of a state estimation device for optical communication using sparse coding. The device according to the present disclosure is a device that estimates the state of optical communication and includes data preprocessing units 111 and 121, a learning unit 112, and a recognition unit 122. The device according to the present disclosure can be realized by a computer and a program, and the program can be recorded on a recording medium or can be provided via a network.

The device according to the present disclosure performs the two steps of "sparse dictionary learning" (S101) and "recognition" (S102). As processing common to these two steps, the data preprocessing units 111 and 121 first perform preprocessing to reduce the number of data and a dimension on constellation data. Next, in step S101 of the sparse dictionary learning, the learning unit 112 performs learning using learning constellation data in which the normality and the error state of optical communication are specified to determine a parameter such as a sparse dictionary. Thus, the device according to the present disclosure acquires a dictionary matrix in which a sparse coefficient corresponding to the constellation data has been learned. Then, in step S102 of the recognition, the recognition unit 122 discriminates the normality or the error state of the optical communication with respect to recognition constellation data using the learned parameter such as the sparse dictionary.

2. Preprocessing

Figure 5:
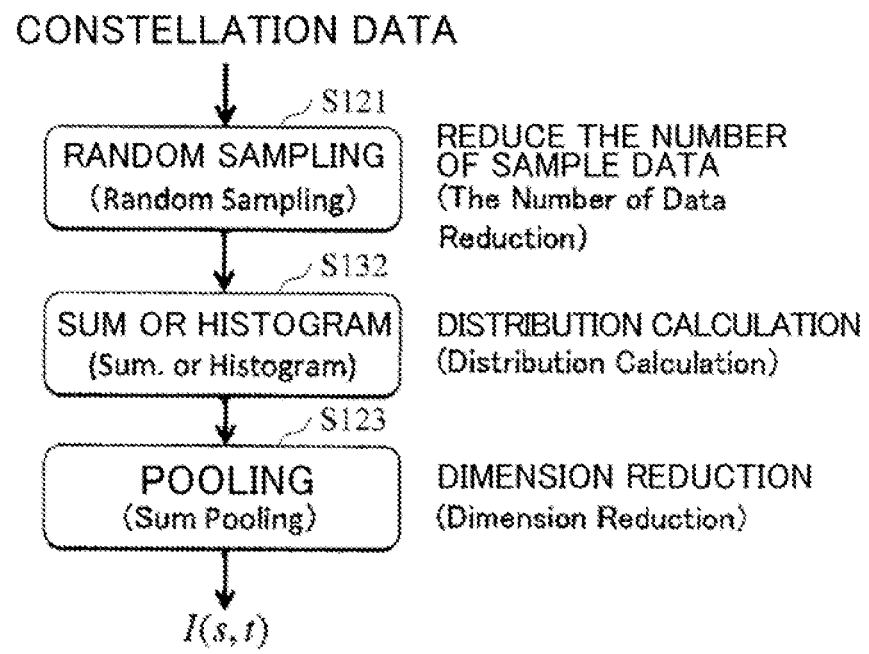
FIG. 5 shows an example of preprocessing.

FIG. 5 shows the flow of the preprocessing. Constellation data is constituted by a plurality of points as shown in FIG. 1. Although its general shape reflects on the error state of optical communication, the constellation data can be used to estimate the state so long as the shape is maintained even with a small number of sample data.

S121: Random Sampling

In the first step, the number of sample data is reduced by random sampling.

S122: Distribution Calculation

The number of constellation data or a histogram I(s, t) belonging to respective coordinates s,t (s=1, ..., S, t=1, ..., T) is calculated.

S123: Pooling

A dimension (resolution) is reduced by pooling. In the pooling, the dimension is reduced using sum pooling so as not to collapse the shape of the constellation data. The pooling is performed on a small block basis of scale×scale. The dimension after the pooling is as follows.

[Math. 01]

$$\bar{S} \times \hat{T} = (S/\text{scale}) \times (T/\text{scale}) \quad (0\text{-}1)$$

In the present disclosure, this dimension is sometimes expressed as S×T.

$y_i$ in which the number of the constellation data or the histogram

[Math. 03]

$$\bar{I}(s,t) \quad (0\text{-}3)$$

finally belonging to the respective coordinates

Figure 6:
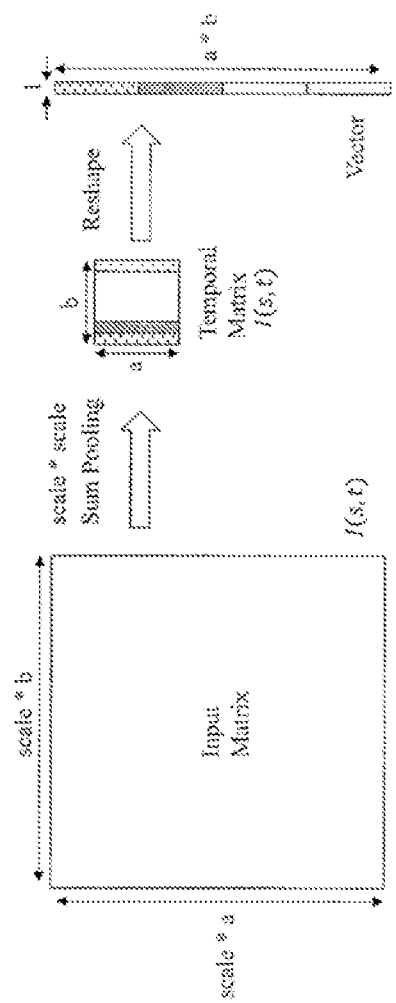
FIG. 6 is an explanatory diagram of pooling (sum pooling) and vectorization.

[Math. 02]

$$s,t(s=1, \ldots \bar{S}, t=1, \ldots, \bar{T}) \quad (0\text{-}2)$$

is arranged as a column vector is used as an observation signal for the sparse dictionary learning and the recognition. Here, i represents the index of the constellation data. FIG. 6 shows a flow from the pooling to the output of the column vector $y_i$.

3. Sparse Dictionary Learning: K-SVD

A set of observation signals $y_i$ is expressed by the following Formula.

[Math. 04]

$$Y=\{y_i\}_{i=1}^{N} \quad (0\text{-}4)$$

An observation signal $y_i$ is an M-dimensional column vector and expressed by the following Formula.

[Math. 05]

$$M=\bar{S}=\hat{T} \quad (0\text{-}5)$$

Figure 7:
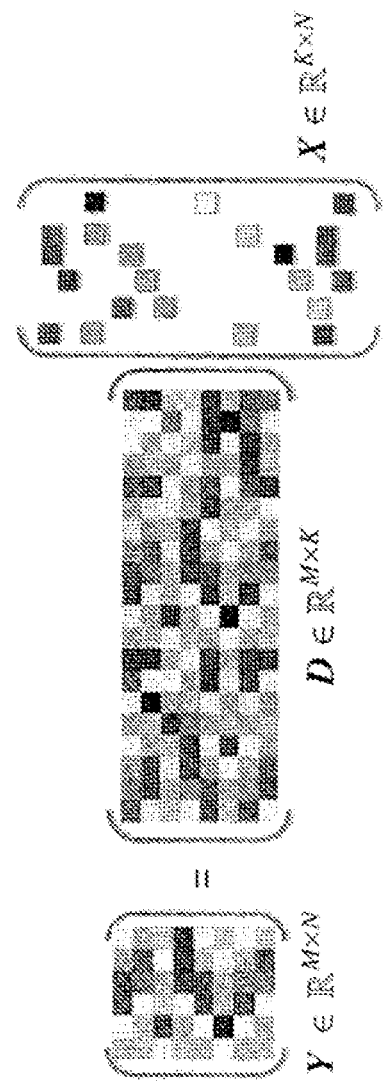
FIG. 7 is an explanatory diagram of sparse dictionary learning: a linear system expressed by a weighted linear sum of a small number of base vectors.

At this time, it is assumed that Y can be expressed by the linear coupling of K bases as shown in FIG. 7.

(Math. 1)

$$Y=DX \quad (1)$$

Here,

[Math. 11]

$$D=\{d_1, \ldots, d_k\} \in \mathbb{R}^{M \times K} \quad (1\text{-}1)$$

is a dictionary matrix having a base $d_k$ (M-dimensional column vector) as an element, and

[Math. 12]

$$X=\{x_i\}_{i=1}^{N} \quad (1\text{-}2)$$

is a matrix having a sparse coefficient $x_i$ (K-dimensional column vector) as an element.

Generally, K>M (the number of bases is greater than the dimension of an observation signal) is established, and an overcomplete dictionary matrix is used. Since the uniqueness of X cannot be assured in the expression Y=DX in which the number of bases is greater than the dimension of a signal, the bases generally used in the expression of an observation signal Y are limited to a part of D. That is, the constraint that only a small amount of $T_0$ coefficients take a non-zero value and remaining most coefficients take a zero value is imposed. A state in which the number of non-zero elements is small with respect to the whole as described above is called sparse. An optimization problem having the constraint of the sparse is formulated as

[Math. 2]

$$\langle D, X \rangle = \min_{D,X} \|Y - DX\|_F^2 \text{ subject to } \forall i, \|x_i\|_0 < T_0. \quad (2)$$

that minimizes a reconfiguration error. Here,

[Math. 21]

$$\|\cdot\|_0 \quad (2\text{-}1)$$

expresses an $L_0$ norm (the number of non-zero elements in a vector), and

[Math. 22]

$$\|\cdot\|_F \quad (2\text{-}2)$$

expresses the norm of Frobenius and is defined by the following Formula.

[Math. 23]

$$\|A\|_F = \sqrt{\Sigma_{ij} A_{ij}^2} \quad (2\text{-}3)$$

In dictionary learning, two steps are generally alternately performed to solve the optimization problem of Formula (2). The learning unit 112 shown in FIG. 4 calculates a sparse coefficient and updates a dictionary.

(a) Step S131: Calculate Sparse Coefficient

Step S131 is the problem of fixing a dictionary matrix D and calculating a sparse coefficient $x_i$ and can be rewritten as the following Formula.

[Math. 3]

$$x_i = \arg\min_{x_i} \|y_i - Dx_i\|_2^2 \text{ subject to } \|x_i\|_0 < T_0 \quad (3)$$

$$i = 1, 2, \ldots, N.$$

However, it has been known that this problem is a combination optimization problem with which an optimum solution cannot be obtained unless all the bases are combined together and is NP-hard. As a solution for this problem, many algorithms such as a method based on a greedy method and a method in which a problem is solved after an $I_0$ constraint is relaxed by an $I_1$ constraint have been proposed. As an example, an orthogonal matching pursuit (OMP) method that is an approximate solution based on an $I_0$ constraint is used in the present disclosure.

(b) Step S132: Update Dictionary Matrix

In step S132, X calculated in step S131 is fixed, and the dictionary matrix D is updated. K-SVD is considered to be a generalized k-means method. In the k-means method, a cluster and a sample correspond to each other one to one. Meanwhile, in the K-SVD, a sample is expressed as the primary coupling of cluster centroids (bases in the K-SVD).

In the K-SVD, a residual from a linear prediction vale in which a base $d_k$ is excluded from a set Y of observation signals

[Math. 4]

$$E_k = Y - \sum_{j \neq k}^{K} d_j x_T^j \quad (4)$$

is subjected to singular value decomposition (SVD) to calculate $d_k$ and $x^k_T$. However, since an obtained solution does not necessarily satisfy the constraint of sparse, only non-zero elements in $x^k_T$ calculated in step S131 are updated in the K-SVD.

When SVD is applied to an error $E^R_k$ at this time and decomposed into orthogonal matrices U and V and a diagonal matrix E, the following Formula is obtained.

[Math. 5]

$$E^R_k = U \Delta V^T = u_1 \cdot \sigma_1 v_1^T + u_2 \cdot \sigma_2 v_2^T + \ldots + u_n \cdot \sigma_n v_n^T. \quad (5)$$

$u_i$ and $v_j$ are the i-th column vectors of U and V, and $\sigma_i$ is the i-th diagonal component of $\Delta$.

In the K-SVD, the approximate solution of the column vector of a base and a sparse coefficient is obtained using components $u_1$ and $\sigma_1 v^T_1$ relating to a first singular value as shown in the following Formulas.

[Math. 6]

$$\text{Base: } d_k = u_1 \quad (6)$$

[Math. 7]

$$\text{Sparse coefficient: } X_R^k = \sigma_1 v_1^T \quad (7)$$

By repeatedly calculating a sparse coefficient (S131) and updating a dictionary matrix (S132) as described above, a dictionary matrix D can be generated. By performing sparse dictionary learning using learning constellation data, a dictionary matrix D in which the constellation data of optical communication put in a normal state or the constellation data of the optical communication put in various error states has been learned can be generated.

4. Learning for Class Classification: LC K-SVD In the K-SVD, sparse representation is calculated so as to minimize a reconfiguration error. Meanwhile, in LC-KSVD, a cost function is set as a weighted sum of (a) A reconfiguration error (first term),
(b) A recognition sparse code error (second term), and
(c) A recognition error with respect to class classification (third term) to learn sparse representation.

[Math. 8] (8)

$$\langle D, W, A, X \rangle =$$

$$\min_{D,W,A,X} \|Y - DX\|_F^2 + \alpha \|Q - AX\|_F^2 + \beta \|H - WX\|_F^2 \text{ subject to } \|x_i\|_0 < T_0$$

The first term is the same reconfiguration error as that of the K-SVD.

In the second term,

[Math. 8-1]

$$Q=[q_1,\ldots,q_n]\in \mathbb{R}^{K\times K} \quad (8\text{-}1)$$

is a recognition sparse code for the class classification of observation signals $y_i$, and the constraint that the observation signals $y_i$ classified into the same class share the same base $d_k$ is imposed. Here, "A" is a linear transformation matrix for mapping sparse representation X to the space of a recognition sparse code Q.

The third term is a recognition error with respect to class classification. W is a matrix for class classification, and

[Math. 8-2]

$$H=[h_1,\ldots,h_N]\in \mathbb{R}^{m\times N} \quad (8\text{-}2)$$

is the class label of an input Y.

[Math. 8-3]

$$h_1=[0,0\ldots 1 \ldots 0,0]^T\in \mathbb{R}^m \quad (8\text{-}3)$$

is the label vector of a class corresponding to an observation signal $y_i$. In the label vector, 1 expresses a corresponding class, and m expresses the number of classes. Each of α and β is a parameter for adjusting a contribution ratio. For example, when there are three error states, the number of classes including a normal state m becomes 4 in total.

Note that Formula (8) can be rewritten as the following Formula. This Formula has the same format as that of Formula (2), and a dictionary can be learned by the same algorithm as that of the K-SVD.

[Math. 9]

$$\langle T, X\rangle = \min_{D,W,A} \|Z - TX\|_F^2 \text{ subject to } \|x_i\|_0 < T_0 \text{ where,} \quad (9)$$

[Math. 10]

$$Z = \begin{bmatrix} Y \\ \sqrt{\alpha}\,C \\ \sqrt{\beta}\,H \end{bmatrix} T = \begin{bmatrix} D \\ \sqrt{\alpha}\,A \\ \sqrt{\beta}\,W \end{bmatrix}. \quad (10)$$

5. Recognition

In step S102 of the recognition, the following Formula is solved using a dictionary D assumed by LC-KSVD with respect to an observation signal $y_i$ shaped from recognition constellation data to calculate a sparse coefficient $x_i$.

[Math. 11]

$$x_i = \arg\min_{x_i} \|y_i - Dx_i\|_2^2 \text{ subject to } \|x_i\|_0 < T_0 \quad (11)$$

For the derivation of the sparse coefficient $x_i$, OMP can be, for example, used.

Next, the calculated sparse coefficient $x_i$ is projected using a matrix W according to the following Formula.

[Math. 12]

$$\hat{h}_i = Wx_i \quad (12)$$

Here, the projection of the sparse coefficient $x_i$ is sometimes represented as "$h_i^\wedge$".

On the basis of an estimation value $h_i^\wedge$ after the projection, any of m classes to which recognition constellation data belongs is discriminated. The class of $h_i^\wedge$ corresponding to the element closest to 1 is discriminated. Thus, any class into which the recognition constellation data is classified can be discriminated. That is, a recognition can be made as to whether the recognition constellation data is classified into a normal state or any of the three error states. Accordingly, a factor causing the degradation of optical communication can be estimated as described above with reference to FIG. 2 and FIG. 3. Note that a factor causing the degradation of optical communication may be set as an output instead of the state of the optical communication in the class classification.

[Evaluation Results]

In order to verify the validity of an invented method, a simulation was performed on 16 AQAM constellation data.

Figure 8:
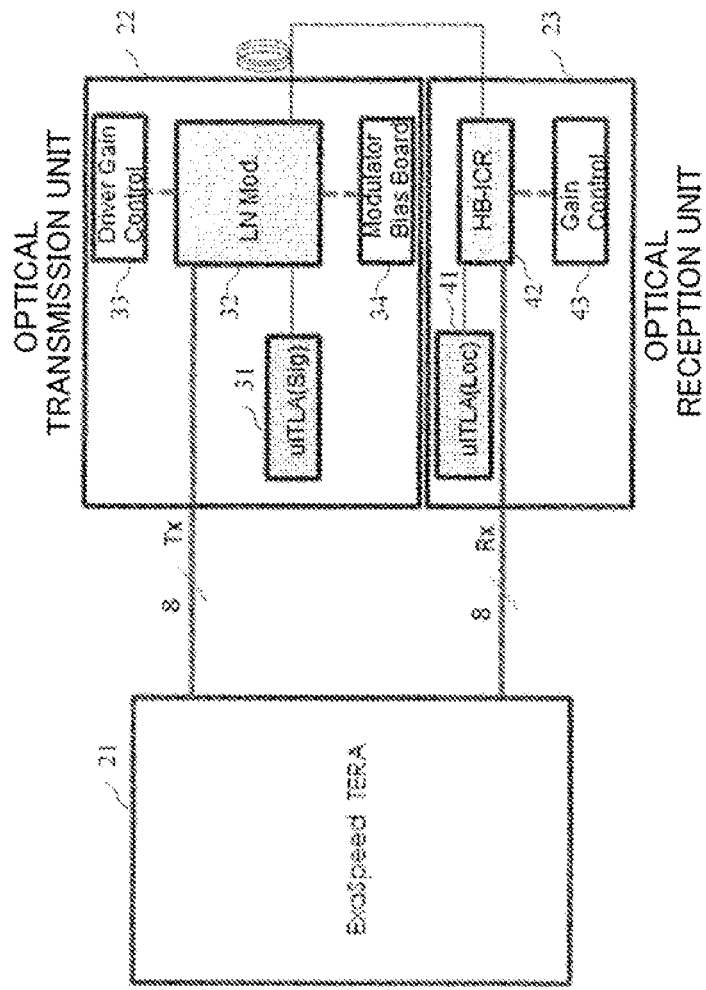
FIG. 8 is a block diagram showing the schematic configuration of an evaluation board.

FIG. 8 shows a block diagram and a photograph of an evaluation board used to acquire constellation data. The evaluation board includes a digital coherent signal processing circuit (DSP) 21, an optical transmission unit 22, and an optical reception unit 23. The optical transmission unit 22 on a transmission side includes a wavelength variable light source (uITLA (Sig)) 31, a modulator (LN Mod.) 32, a gain controller 33 for a modulator, and a bias controller 34. The optical reception unit 23 on a reception side includes a wavelength variable light source (uITLA (Loc)) 41, a high-speed integrated coherent receiver (HB-ICR) 42, and a gain controller 43 for an HB-ICR. In the DSP 21, a 64 GBaud class PDM-multivalued QAM signal is generated and converted into an optical modulation signal. In the optical reception unit 23, an optical signal is photoelectrically converted by the HB-ICR 42 and output to the DSP 21 via high-frequency wiring same as that of the optical transmission unit 22. Thus, a received signal is processed in the DSP 21.

The dimension of the acquired constellation data is 19600 (S×T=140×140), and the number of data per one constellation data is 8192. A normal state and three error states (the phase error of a master bias in a modulator, the imbalance state of an I/Q gain, and the imbalance state of an I/Q skew) were artificially generated to acquire the constellation data.

Ten constellation data was randomly selected from the respective classes of a normal state and three errors and used as learning constellation data. Further, 200 constellation data was randomly selected from respective classes as recognition constellation data. Basic parameters were set as follows:

The number of sample data: 4000
Dimension S×T: 20×20=400 (scale=7)
Dictionary size K: 60
Sparse ratio: 20%
where the sparse ratio is defined as

[Math. 13]

$$\text{Sparse ratio} = \frac{\text{The number of selected bases}}{\text{Dictionary size } K} \times 100[\%]. \quad (13)$$

Windows 7 was used as OS, and MALAB was used as a software language. With the above settings, the recognition ratio of the proposed method reached 100%. A data amount was about 1/100 with respect to original data, a learning time (training time) was about 1.6 seconds, and a recognition time was less than 0.1 seconds. As a result, the achievement of high recognition performance was confirmed with a small amount of data and a substantially low computing amount.

Figure 9:
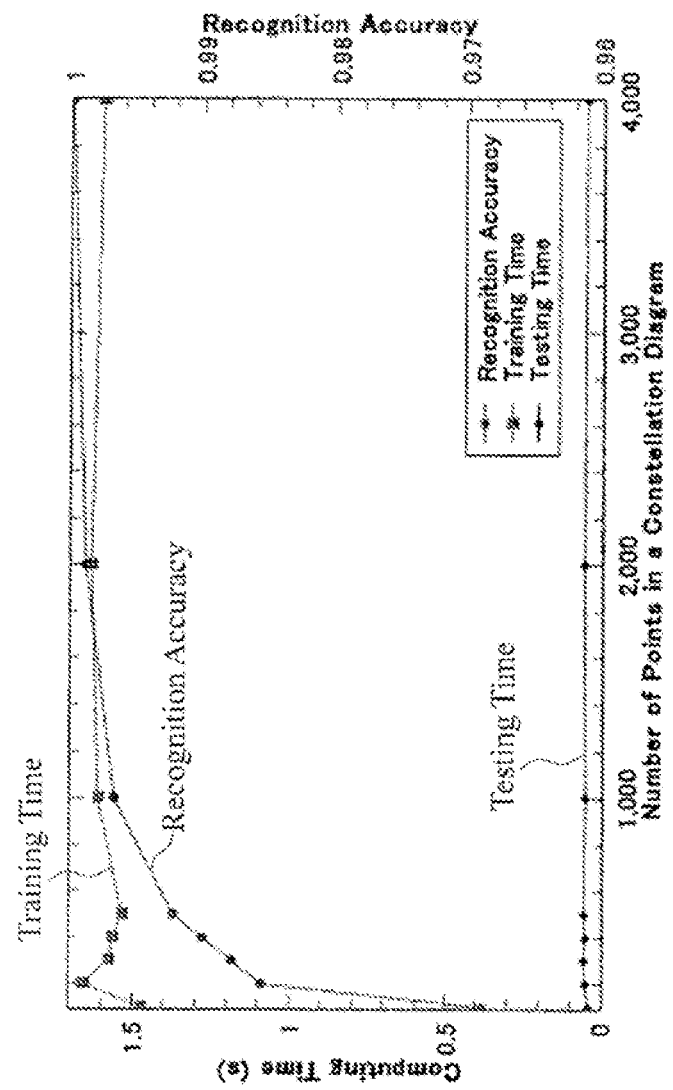
FIG. 9 shows an example of the simulation result of a recognition ratio and a computing amount obtained when a data amount (the number of sample data) was made variable.

Next, a recognition ratio (recognition accuracy) and a computing amount (computing time) in a case in which data amounts (the number of sample data and a dimension) were made variable were evaluated. FIG. 9 shows results obtained when the number of sample data was made variable. The recognition ratio exceeds 99% when the number of sample data is about 500 and reaches 100% when the number of the sample data is 4000. It can be confirmed that the computing amount does not depend on the number of the sample data and does not change largely.

Figure 10:
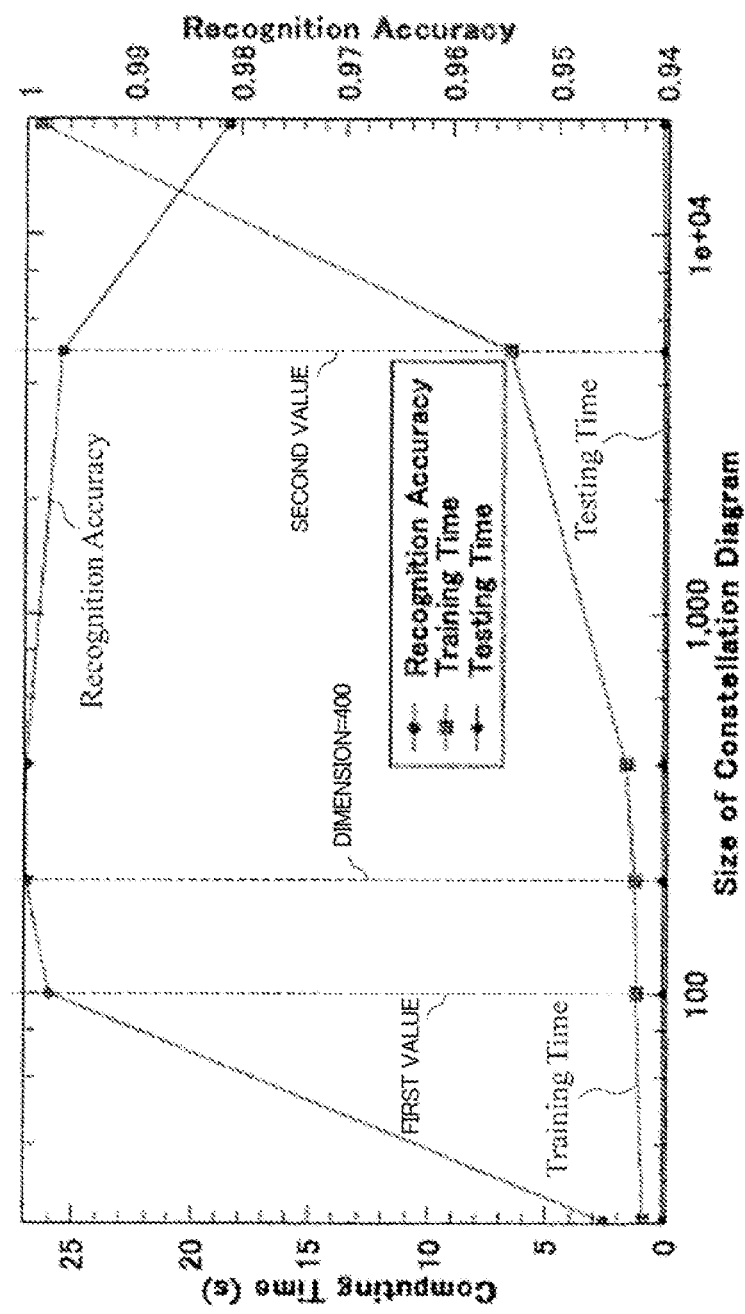
FIG. 10 shows an example of the simulation result of a recognition ratio and a computing amount obtained when a data amount (dimension) was made variable.

FIG. 10 shows results obtained when a dimension was made variable. A recognition ratio slightly reduces when the dimension is smaller than a first value (10×10=100 or less) and larger than a second value. It appears that a reduction in the recognition ratio obtained when the dimension is large is caused by the influence of overtraining, but a recognition ratio of 98% or more is achieved. A computing amount is likely to increase rapidly when a dimension is over 1000 in terms of learning. With respect to constellation data at this time, the recognition accuracy is 100% when the dimension is about 400 and a learning time (training time) is substantially short. Therefore, the dimension was set as a basic parameter value.

Effects of the Invention

According to a state estimation method using sparse coding relating to the present invention, it is possible to estimate the state of a transmission path or an optical transmitter in optical communication with a small amount of constellation data and a low computing amount.

INDUSTRIAL APPLICABILITY

The present disclosure is applicable to information communication industry.

REFERENCE SIGNS LIST

11 LD
12X, 12Y Optical I/Q modulator
13X, 13Y Phase modulator
14 Polarized wave synthesizer
21 DSP
22 Optical transmission unit
23 Optical reception unit
31 Wavelength variable light source
32 Modulator
33 Gain controller
34 Bias controller
41 Wavelength variable light source
42 High-speed integrated coherent receiver
43 Gain controller

The invention claimed is:

1. A device for estimating a state of optical communication, the device comprising:
a processor; and
a storage medium having computer program instructions stored thereon, when executed by the processor, perform to:
reduces the number of data using random sampling with respect to constellation data in which an amplitude and a phase of optical communication data are represented by a polar coordinate diagram and performs distribution calculation and a resolution reduction, thereby forming reduced constellation data;
learns a dictionary matrix in sparse coding using the reduced constellation data; and
calculates a sparse coefficient using the reduced constellation data and the dictionary matrix and estimates a factor causing degradation of the optical communication using the calculated sparse coefficient, where the factor is one of a phase error of bias in a modulator, an imbalanced state of I/O gain or an imbalanced state of I/O skew.

2. A method for estimating a state of optical communication, the method comprising:
reducing the number of data using random sampling with respect to constellation data in which an amplitude and a phase of optical communication data are represented by a polar coordinate diagram and performing distribution calculation and a resolution reduction, thereby forming reduced constellation data;
learning a dictionary matrix in sparse coding using the reduced constellation data; and
calculating a sparse coefficient using the reduced constellation data and the dictionary matrix and estimating a factor causing degradation of the optical communication using the calculated sparse coefficient, where the factor is one of a phase error of bias in a modulator, an imbalanced state of I/O gain or an imbalanced state of I/O skew.

3. A non-transitory computer-readable medium having computer-executable instructions that, upon execution of the instructions by a processor of a computer, cause the computer to perform:
a data preprocessing step of reducing the number of data using random sampling with respect to constellation data in which an amplitude and a phase of optical communication data are represented by a polar coordinate diagram and performing distribution calculation and a resolution reduction, thereby forming reduced constellation data;
a learning step of learning a dictionary matrix in sparse coding using the reduced constellation data processed in the data preprocessing step; and
a recognition step of calculating a sparse coefficient using the reduced constellation data processed in the data preprocessing step and the dictionary matrix generated in the learning step and estimating a factor causing degradation of the optical communication using the calculated sparse coefficient, where the factor is one of a phase error of bias in a modulator, an imbalanced state of I/O gain or an imbalanced state of I/O skew.

* * * * *